S. M. LILLIE.
PROCESS FOR THE MANUFACTURE OF SALT.
APPLICATION FILED MAR. 12, 1910.
1,056,558. Patented Mar. 18, 1913.
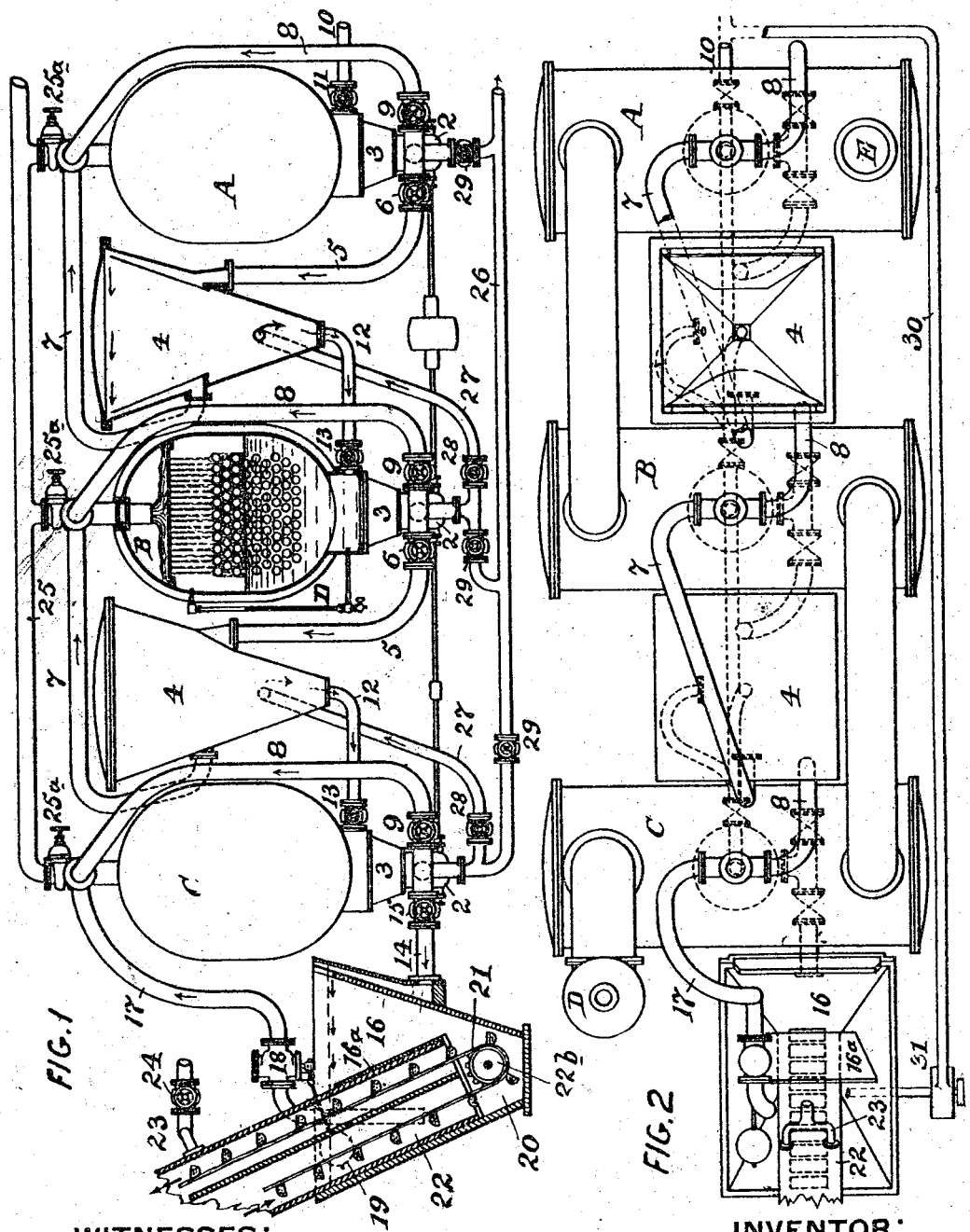
WITNESSES:
INVENTOR:
Samuel Morris Lillie
By his atty

UNITED STATES PATENT OFFICE.

SAMUEL MORRIS LILLIE, OF PHILADELPHIA, PENNSYLVANIA.

PROCESS FOR THE MANUFACTURE OF SALT.

1,056,558.  Specification of Letters Patent.  Patented Mar. 18, 1913.

Application filed March 12, 1910. Serial No. 548,823.

*To all whom it may concern:*

Be it known that I, SAMUEL MORRIS LIL-LIE, a citizen of the United States, and resident of the city and county of Philadelphia, State of Pennsylvania, have invented an Improvement in Processes for the Manufacture of Salt, of which the following is a specification.

My invention has reference to a method for the manufacture of salt, and consists of certain improvements which are fully set forth in the following specification and shown in the accompanying drawings which form a part thereof.

The object of my invention is to provide a suitable process and apparatus for the manufacture of salt by use of a multiple effect which shall have capacity not only for the transference of the brine from effect to effect during the concentration thereof, but which shall also enable the transference of the salt crystals whereby they may be caused to pass from the effect and settling tank by which they are produced into the next effect, and so on until they are finally removed as a commercial product.

Salt crystals are also designated by the single word "salt" in this specification and in the claims of this application.

My invention consists in apparatus and method for the manufacture of salt or other crystalline body capable of being produced by concentration of a solution, as more fully described hereinafter and particularly defined in the claims.

Referring to the drawings: Figure 1 is a front elevation with part in section of an evaporating apparatus embodying my invention; and Fig. 2 is a plan view of the same.

A, B and C are three effects which are connected in the usual manner, the first effect A being supplied in its steam chamber with steam through an inlet E, and the last effect C of the series has its vapor chamber connected with a condenser D. Each of these effects is provided with a circulating pump 2 which draws its supply of liquid from the evaporating chamber of the effect through the leg or pocket 3, and re-circulates it over the evaporating tubes by the pipe connection 8 having the control valve 9. Each of the effects is provided with an outside settling chamber which, in the case of the effects A and B are designated by 4, and shown at a higher elevation than the pump 2, whereas the last effect C is provided with a settling chamber 16 which may be at any suitable level and shown at a lower elevation than the settling chambers 4. The effect A has a pipe connection 5 from its pump 2 with the top of the settling chamber 4 belonging to it, and said pipe 5 is provided with a control valve 6. The opposite side of the settling chamber 4 at its top is connected by a pipe 7 with the top of the vapor chamber on the effect A. The bottom of the settling chamber 4, just referred to, is connected by a pipe 12 with the leg or pocket 3 of the next effect B, and said pipe is provided with a valve 13. It will be observed that the pipe connection 12 with the pocket 3 is at a higher elevation than the pump 2 of this effect B.

The effect B is similarly provided with a settling chamber 4 and with all of the pipe connections 5, 7 and 8, and valves 6 and 9 corresponding to the similar parts in respect to the effect A. The settling chamber 4 belonging to the effect B has its bottom connected by a pipe 12 with the leg 3 of the effect C and above the pump 2 thereof, and this pipe 12 is provided with a control valve 13, said parts being precisely the same as the corresponding parts connecting the settling tank 4 of the effect A with the leg of the effect B.

The effect C has its pump 2 connected with a pipe 8 having a valve 9 through which the brine may be re-circulated within its evaporating chamber similar to the other effects. The pump 2 of the effect C discharges through a pipe 14 into the settling tank 16 having a central partition 16ª extending across the settling tank, but not extending to the bottom thereof nor to the liquid level therein. The pipe 17 opens from the settling chamber 16 back of the partition 16ª thereof and discharges into the evaporating chamber of the effect C under the influence of the partial vacuum therein and the supply of liquid through the said pipe is automatically controlled by the valve 18 and its float 19, the latter being operated by the level of the brine in the settling chamber 16.

Arranged within the settling chamber 16 and extending upward therefrom, is a trunk 22 open at the bottom and through which an endless bucket conveyer 21 travels. This conveyer passes about a pulley 22ᵇ arranged in the lower part of the settling chamber 16.

A brine pipe 23 is arranged so as to discharge brine into the trunk 22 at a distance above the level of the liquid in the settling chamber 16, and said supply of fresh brine may be controlled by a valve 24.

The settling chambers 4 are closed chambers, whereas the settling chamber 16 may be an open chamber, but it is evident that these details may be modified by suitable provision which would maintain the circulation without destroying the partial vacuum necessary in an apparatus of this character, and therefore I do not restrict myself to either closed or open settling chambers.

In addition to these pipes, valves and connections already described, the following additional pipes are employed. A pipe 10 opens into the leg 3 of the effect A, and is provided with a control valve 11 and corresponds in position to the pipe 12 referred to in connection with the effects B and C. This pipe may be employed for supplying the effect A with fresh brine directly, or brine and salt crystals floating therein, by means of a pipe 30 and circulating pump 31 (Fig. 2). A pipe 27 from the pump 2 of the effect B connects with the settling chamber 4 of the effect A at a distance above its bottom, and said pipe is provided with a control valve 28. A similar pipe 27 having a valve 28 connects the pump 2 of the effect C with the settling chamber 4 of the effect B at a distance above its bottom. A pipe 26 may have branch connections with each of the pumps 2, and controlled by valves 29 from which the bittern liquor may be discharged as waste, when desired. A pipe 25 may have valve connections 25ᵃ with each of the evaporating chambers of the several effects for supplying water thereto, or if desired, supplying brine when charging the several effects in the first instance. Each of the effects A, B and C may be provided with glass gages or other suitable means for indicating the level of the brine therein. One of these gages is indicated at D, in Fig. 1, in connection with the middle effect B.

The settling chambers 4 and 16 are shown as of much greater area at the top than at the bottom; and furthermore, have their inlets and outlets for the circulating brine at the greatest distance apart, so as to reduce the speed of flow and give the salt full opportunity to settle. The discharge openings of the pipes 5 and 14 are made the full width of the settling chambers 4 and 16 as indicated in Fig. 2, and similarly the inlet to the pipe 7 from the settling chambers 4 is of the full width. In this manner the brine, passing through the pipe 5, spreads out and reduces its speed of flow in passing through the settling chamber. The settling chambers are shown in the form which I prefer to make them, but it will be understood that the shape of these chambers may be greatly modified without departing from the principles of my invention.

Multiple effect apparatus shown in this application, by way of illustration, is of the type known as the "Lillie" apparatus, and while I prefer to use my improvements in connection with such an apparatus, whether it be single acting or reversible, I do not confine myself to any particular details of construction of the multiple effect apparatus itself.

The operation of the apparatus will now be understood, and may be described as follows: Assuming that the several effects A, B and C are partly full of brine as indicated in the effect B in Fig. 1, and moreover that the several settling chambers 4 are filled with brine, and that the settling chamber 16 is filled with brine to the level of the dotted line adjacent to the arrows, and the effects being in operation as commonly understood with the steam supplied to the steam chamber of the effect A and the condenser D in operation to produce a partial vacuum in the vapor chamber of the effect C, the following operation will take place: By adjusting the valves 6 and 9 of the effect A, a certain part of the brine being concentrated will be circulated through the effect A by means of the pipe 8 and the remaining part will be circulated through the settling chamber 4 belonging to the effect A by the pipes 5 and 7, and will carry with it salt which has been separated by evaporation in effect A, which, held in suspension, will settle in the bottom of the settling chamber 4 because of the reduced speed of travel of the brine across the top thereof. Simultaneous with the above described operation, the valves 13 and 28 of the effect B are so adjusted that the brine and any salt suspended therein will be circulated from the bottom of the settling chamber 4 of the effect A through the leg 3 and pump 2 of the effect B, in this manner transferring to the said effect B the salt of the effect A which has been delivered to its settling chamber 4. Simultaneous with this action last described, the adjustment of the valves 6 and 9 of the effect B will cause a circulation of the brine of the said effect B through its settling chamber 4 and re-circulated by the pipes 5, 7 and 8 in precisely the same manner as occurred in connection with the effect A and its settling chamber, but in this case the brine circulated will be more greatly charged with salt and consequently there will be greater deposition of crystallized salt than occurred in the lower part of the settling chamber 4 of the effect A. The salt crystals in the bottom of the settling chamber 4 of the effect B is circulated through the leg 3 and pump 2 of the effect C by means of the pipes 12 and 27 connecting therewith, and respectively provided with valves 13 and 28. By this means the salt crystals are transferred from the effect B and its settling chamber to the effect C in which the preliminary evaporation takes place. The adjustment of the valves 9 and 15 of the effect C will control the circulation of its brine through the pipe 8 and through the pipes 14 and 17. The brine, with the suspended salt crystals, is circulated under the action of the pump through the upper part of the settling chamber 16 where the speed of travel is reduced, thence over the partition 16ª, thence upward through the pipe 17 into the evaporating chamber of the effect C. The salt crystals which are deposited from the circulating brine in its passage through the settling chamber 16, fall by gravity to the bottom or pocket 20 of said chamber, from which it is lifted by the endless conveyer 21 and carried upward through the trunk 22 to the bins in which it is deposited and dried. The trunk 22, through which the salt is conveyed by the conveyer, has its lower part kept filled with fresh brine from the pipe 23, the flow from which is intended to be equal to the loss of the brine in the effects due to evaporation. As this brine is unconcentrated as to impurities and is in the purest condition, it acts as a washing medium for the rising salt being conveyed by the conveyer, the said salt slowly passing through the said fresh brine in such a manner as to cause any impurities as well as more impure brine to be washed from the salt crystals. As this fresh brine causes the level of the brine in the settling chamber 16 to rise, the valve float 19 will operate the valve 18 to permit enough of the brine to be drawn into the effect C to maintain the level in the settling chamber 16 substantially constant, but care should be taken not to open the valve 24 of the fresh brine pipe 23 to supply more brine than is required to maintain the proper level in the several effects. In the above description, I have described how the salt and circulating brine is transferred from one effect to the next; and in a broad sense, this is not unlike the ordinary circulation which takes place in a multiple effect evaporating apparatus without settling chambers, but it will be readily appreciated that the use of settling chambers for handling the saturated brine and salt crystals will permit the more effective operation of the apparatus because of the special provision made for positively transferring the salt crystals from one effect to the other.

It is most important that various valves 6, 9, 28, 13 and 15 shall be carefully adjusted to control the transference of the brine in the one direction and the salt crystals in the other direction, the said operation being insured by balancing the degrees of circulation under the action of the pumps whether it be the circulation between the effect forward to its settling chamber, or the circulation from the following effect back to the settling chamber of the next preceding effect. While the salt crystals are transferred in the direction from the effect A to the settling chamber 16, the brine which is delivered by the pipe 28 is gradually transferred in the opposite direction or from the settling tank 16 to the effect A, but in arriving at the latter destination, it is required to pass successively through the several effects and the intermediate settling chambers. In accomplishing this result the fresh brine passes through pipe 17 into the effect C where it is partly evaporated by recirculation therethrough. Part of this brine is circulated through the settling chamber 4 of the effect B by means of the pipes 12 and 27 and the pump 2, and part of this brine delivered to the said settling chamber 4 passes into the circulation through the pipes 5 and 7, and thereby enters the circulation of the effect B. In a similar manner the saturated brine is delivered from the effect B into the settling chamber 4 of the effect A and by the pipes 5 and 7 into the circulation of the said effect A, and what is not consumed by evaporation and loss by salt crystallization, may be discharged as bittern through the pipe 26 under the control of valve 29. It will thus be seen that the brine passes through the multiple effect evaporating apparatus in one direction, while the salt crystals are caused to travel with certainty in the other direction, with the result that salt crystals produced by the apparatus are conveyed away at the same place where the fresh brine is supplied to the apparatus.

In the operation of this apparatus the circulation of the brine in any effect operates to cause the said brine to produce a crystallization of the salt and permit it to disengage itself in the settling chamber belonging to said effect. When the transference of that salt from the settling chamber takes place to the next effect, it is accomplished by means of the brine of that effect under the action of its own pump, and it is evident that this brine will enter more or less into the circulation of the liquor from which the salt has been crystallized to compensate for the loss thereof due to the crystallization and evaporation.

While the circulation of the salt crystals travel in one direction through the apparatus and the brine flows in the reverse or contrary direction, it will be understood that the evaporation which takes place in the several effects produces a concentration of the impurities in the brine, just as would take place in any multiple effect evaporating apparatus, but there is the advantage in this process that it gradually transfers these impurities to the effect A from which they may pass off with the bittern, being a point most distant from the place where the salt is being washed and removed, so that the salt in being transferred from effect A to the settling chamber 16 is subjected to the cleansing action of gradually purer brine.

The circulation of the brine through the pipes 8 of the effects carries with it considerable quantities of salt and this acts as a scouring agent when it flows over the evaporating tubes as indicated in the effect B in Fig. 1, and tends to prevent or reduce the incrustations which are apt to form in the evaporating tubes.

The pipes 8 may be used in washing out the effects when desired. For instance, if the effect B is to be washed, the valves 28 and 13 are closed and the brine from the effect passes by pipe 5 into the chamber 4. The valve 6 is then closed and water from pipe 25 is admitted by valve 25$^a$ until the effect is about half full. The valve 25$^a$ is then closed and the pump 2 being in operation circulates the water through the pipe 8 and evaporating chamber of the effect B until it is thoroughly washed. The water may then be run off in the main 26 by opening the valve 29. The valve 29 is then closed and valve 6 opened, permitting the brine to flow from chamber 4 into the effect B. Then valves 13 and 28 are opened and the operation may proceed as hereinbefore explained for manufacture of salt.

While I have shown the settling chambers 4 at a higher elevation than the pumps 2 this is not necessary as they may be located at any level, if so desired.

In this application I do not make any claim to an evaporator combined with a settling chamber, such as chamber 16, provided with the conveyer and the washing devices for the salt, as the said combination, broadly considered, forms subject matter of my application, serially numbered 532,696, and filed on Dec. 11, 1909, but such an apparatus when combined with the additional circulating pipe 8 in connection with the circulating pump is a portion of my present invention. My improvements are, however, more particularly directed to the multiple effect system of salt evaporation, which is especially useful with impure brine because, as pointed out in the foregoing part of this specification, the brine crystals are caused to be conveyed through the apparatus in one direction, whereas the impurities due to the concentration thereof are caused to travel in the opposite direction, so that the clear salt crystals are removed from the system where the brine is cleanest, and the impurities are collected in the system at a point most distant from the point of removal of the salt, the result being that a comparatively pure salt is obtained from an impure brine than would otherwise be the case.

While I have shown my apparatus in the form which I prefer, I do not restrict myself to the details of construction shown, as these may be modified in various ways without departing from the spirit of the invention.

In this application I make no claim for the apparatus as that will form subject matter of a divisional application.

Having now described my invention, what I claim as new and desire to secure by Letters Patent, is:

1. The herein described method of manufacturing salt which consists in evaporating a salt brine in an inclosed evaporator chamber, circulating a portion of the salt laden brine from said evaporator chamber through a settling chamber of sufficiently quiescent brine for causing the suspended salt to be precipitated in said quiescent brine, and circulating another portion of the brine together with its suspended salt crystals over the evaporating surfaces in the evaporator chamber during the performance of their evaporating function upon the brine.

2. The herein described method of manufacturing salt which consists in evaporating a salt brine in an inclosed evaporator chamber, circulating a portion of the salt laden brine from said evaporator chamber through a settling chamber of sufficiently quiescent brine for causing the suspended salt to be precipitated in said quiescent brine, circulating another portion of the brine together with its suspended salt crystals over the evaporating surfaces in the evaporator chamber during the performance of their evaporating function upon the brine, and regulating the relative proportion of the two parts of the brine to insure the simultaneous proper precipitation of salt crystals in the separating chamber and the maintenance of the desired circulation of the salt laden brine over the evaporating surfaces.

3. In the manufacture of salt, the herein described method which consists in subjecting brine to the evaporating action of a series of effects of a multiple effect apparatus and concentrating the impurities therein and transferring them gradually from the last effect of the series to the first effect thereof, simultaneously therewith producing salt crystals in the several effects and transferring the said salt crystals through the multiple effect apparatus in a direction contrary to the travel of the impurities, and finally precipitating the suspended salt from the brine in a settling chamber independent of the last effect of the series.

4. In the manufacture of salt, the herein described method which consists in subjecting brine to the evaporating action of a series of effects of a multiple effect apparatus and concentrating the impurities therein and transferring them gradually from the last effect of the series to the first effect thereof, simultaneously therewith producing salt crystals in the several effects and transferring the said salt crystals through the multiple effect apparatus in a direction contrary to the travel of the impurities, precipitating the suspended salt from the brine in a settling chamber independent of the last effect of the series, and removing the said salt from the settling chamber and simultaneously displacing therefrom any impurities or impure brine from the surface of the crystals by passing the salt through a body of fresh brine.

5. In the manufacture of salt, the herein described method which consists in subjecting brine to the evaporating action of a series of effects of a multiple effect apparatus and concentrating the impurities therein and transferring them gradually from the last effect of the series to the first effect thereof, simultaneously therewith producing salt crystals in the several effects and transferring the said salt crystals through the multiple effect apparatus in a direction contrary to the travel of the impurities, precipitating the suspended salt from the brine in a settling chamber independent of the last effect of the series, removing the said salt from the settling chamber and simultaneously displacing therefrom any impurities or impure brine from the surface of the crystals by passing the salt through a body of fresh brine, mixing the fresh brine with the brine from which the salt crystals are being precipitated, and supplying the said brine mixture to the last effect of the series.

6. The herein described method of manufacturing comparatively pure salt which consists in evaporating two bodies of brine under different temperatures, transferring the portion of the brine with the suspended salt from the body having the higher temperature to a cooler body of brine and thereby causing a greater crystallization of the salt to increase the relative quantjty of suspended salt in the brine, circulating the portion of said cooler body of brine having the greatest quantity of salt crystals through the body of brine being evaporated under the lower temperature and circulating the portion of the cooler body of brine having the least quantity of salt crystals back into the body of brine being evaporated at the higher temperature, transferring that portion of the body of brine of the higher temperature carrying the greater quantity of salt crystals to a point beyond the influence of the heat of the body of brine of higher temperature, and reducing the temperature and flow of said transferred portion of brine for precipitating its salt crystals.

7. The herein described method of manufacturing comparatively pure salt which consists in evaporating two bodies of brine under different temperatures, transferring the portion of the brine with the suspended salt from the body having the higher temperature to a cooler body of brine and thereby causing a greater crystallization of the salt to increase the relative quantity of suspended salt in the brine, circulating the portion of said cooler body of brine having the greatest quantity of salt crystals through the body of brine being evaporated under the lower temperature and circulating the portion of the cooler body of brine having the least quantity of salt crystals back into the body of brine being evaporated at the higher temperature, transferring that portion of the body of brine of the higher temperature carrying the greater quantity of salt crystals to a point beyond the influence of the heat of the body of brine of higher temperature, and reducing the temperature and flow of said transferred portion of brine for precipitating its salt crystals, and returning the brine from which the salt crystals have been precipitated to body of brine being evaporated at higher temperature.

8. In the manufacture of salt by the evaporation of salt brines in a multiple effect evaporator—the transferring of the salt separated in two or more of the effects, into one of the said effects and removing the mixed salts from the said one of the effects.

9. In the manufacture of salt by the evaporation of salt brines in a multiple effect evaporator, the transferring of the salt formed in two or more of the effects into the coolest effect and thus collecting the salt made in the said two or more effects in the said coolest effect and then removing the collected salt from the coolest effect and thereby from the multiple effect.

10. In the manufacture of salt by the evaporation of salt brines in a multiple effect evaporator, the method of moving salt formed in one effect into a second effect consisting in circulating a current of brine from the latter effect through the place of deposit for the salt in the former effect and back into the latter effect.

11. In the manufacture of salt by the evaporation of salt brine in a multiple effect evaporator the method of feeding brine from one effect to another effect in the series, consisting in circulating brine from the former into the latter and back into the former and in regulating the forward and return flows of the circulating brine to give an excess to the forward flow and thereby feed the brine from the one effect to the other by the amount of this excess, which may be regulated to give the feed desired.

12. In the manufacture of salt by the evaporation of salt brines in a multiple effect evaporator the method of transferring the salt formed in one effect into another effect, and simultaneously feeding brine from the latter to the former effect consisting in circulating brine from the latter effect through the place of deposit for the salt in the former effect and back into the latter effect laden with salt, and in regulating the forward and return flows of the circulating brine to give an excess to the forward flow equal to the desired feed of brine from the one effect to the other.

13. In the manufacture of salt by the evaporation of salt brines in a multiple effect evaporator, the method of transferring both salt and brine from one effect to another consisting in circulating brine from the latter effect through the place of deposit for the salt in the former effect and back into the latter, and in regulating the rates of the forward and return flows of the circulating brine to give an excess to the return flow to the extent desired for the brine transfer from the one effect to the other.

14. In the manufacture of salt by evaporation from a salt brine containing soluble impurities which are concentrated in the brine by evaporation, the method of separating the salt from the impure brine resulting from the evaporation consisting in evaporating the brine in a series of evaporators one after another in succession with the impurities increasing in the brine as it progresses through the series and in transferring the salt made in the evaporators by the evaporation from evaporator to evaporator of the series in succession in the reversed direction to the progress of the brine through the series until the salt collects in the evaporator into which the fresh brine enters, and in removing the salt from said evaporator, into which the fresh brine enters.

15. In the manufacture of salt by evaporation from a salt brine containing soluble impurities, which are concentrated in the brine by evaporation, the method of separating the salt from the impure brine resulting from the evaporation consisting in evaporating the brine in a series of evaporators one after another in succession with the impurities increasing in the brine as it progresses through the series and in transferring the salt made in the evaporators by the evaporation from evaporator to evaporator of the series in succession in the reverse direction to the progress of the brine through the series until the salt collects in the evaporator into which the fresh brine enters, and in removing the salt from said evaporator, into which the fresh brine enters and finally in washing the said removed salt by the fresh brine before it passes into the first of the series of evaporators.

16. In the manufacture of salt by the evaporation of salt brines in an evaporator the method of removing the salt from the evaporator consisting in causing a flow of salt bearing brine from the place in the evaporator into which the salt settles from the evaporating brine into an adequate volume of settling brine in a suitable containing vessel, in allowing the salt to settle through this volume of brine, and finally in removing the salt from this settling brine continuously as it is brought into the same by the flow of the said salt bearing brine from the evaporator.

17. In the manufacture of salt by the evaporation of salt brines in an evaporator the method of removing the salt from the evaporator consisting in causing a flow of salt bearing brine from the place in the evaporator into which the salt settles from the evaporating brine into an adequate volume of settling brine in a suitable containing vessel, in allowing the salt to settle through this volume of brine, and finally in removing the salt from this settling brine continuously as it is brought into the same by the flow of said salt bearing brine from the evaporator and returning brine to the evaporator to maintain the said volume of brine approximately constant.

18. In the manufacture of salt by the evaporation of salt brines in an evaporator the method of removing the salt from the evaporator consisting in causing a flow of salt bearing brine from the place in the evaporator into which the salt settles from the evaporating brine into an adequate volume of settling brine in a suitable containing vessel, in allowing the salt to settle through this volume of brine, and finally in removing the salt from this settling brine continuously as it settles and returning brine to the evaporator at a rate automatically controlled by the varying volume of the settling brine to maintain its volume constant within certain limits.

In testimony of which invention, I hereunto set my hand.

S. MORRIS LILLIE.

Witnesses:
R. M. HUNTER,
R. M. KELLY.